United States Patent
Liu

(10) Patent No.: US 9,876,812 B1
(45) Date of Patent: *Jan. 23, 2018

(54) AUTOMATIC MALWARE SIGNATURE EXTRACTION FROM RUNTIME INFORMATION

(71) Applicant: Trend Micro Incorporated, Tokyo (JP)

(72) Inventor: Chung Chang Liu, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/339,102

(22) Filed: Oct. 31, 2016

Related U.S. Application Data

(63) Continuation of application No. 14/726,173, filed on May 29, 2015, now Pat. No. 9,516,055.

(51) Int. Cl.
    *H04L 29/06* (2006.01)
(52) U.S. Cl.
    CPC ........ *H04L 63/1416* (2013.01); *H04L 63/145* (2013.01); *H04L 63/1425* (2013.01); *H04L 63/1433* (2013.01)
(58) Field of Classification Search
    CPC ............. H04L 63/1416; H04L 63/1425; H04L 63/1433; H04L 63/145
    See application file for complete search history.

(56) References Cited

U.S. PATENT DOCUMENTS

| | | |
|---|---|---|
| 8,104,089 B1 | 1/2012 | Guo |
| 8,161,548 B1 | 4/2012 | Wan |
| 9,516,055 B1 | 12/2016 | Liu |
| 2005/0172337 A1 | 8/2005 | Bodorin |
| 2010/0031353 A1 | 2/2010 | Thomas et al. |
| 2010/0058474 A1 | 3/2010 | Hicks |
| 2011/0107307 A1 | 5/2011 | Liu |
| 2013/0047257 A1 | 2/2013 | Aziz |
| 2014/0283058 A1 | 9/2014 | Gupta |
| 2015/0096023 A1 | 4/2015 | Mesdaq et al. |

FOREIGN PATENT DOCUMENTS

WO    WO 2015/038944 A1    3/2015

OTHER PUBLICATIONS

Roundy et al. (Hybrid Analysis and Control of Malware, RAID 2010, LNCS 6307, pp. 317-338, 2010).*

(Continued)

*Primary Examiner* — Oleg Korsak
(74) *Attorney, Agent, or Firm* — Okamoto & Benedicto LLP

(57) ABSTRACT

A computer system receives a file and instruments an original code of the file in memory. The resulting instrumented code allows for collection of runtime information of the original code. An unpacking routine that includes one or more instructions that execute several times, modify memory locations, and execute instructions in the modified memory locations is identified. The unpacking routine is deemed a malware signature and incorporated into a malware pattern. An unpacking behavior diagram can also be generated from the runtime information.

17 Claims, 15 Drawing Sheets

(56) References Cited

OTHER PUBLICATIONS

Teller et al. (Enhancing Automated Malware Analysis Machines with Memory Analysis, blackhat, USA 2014, 5 pages).*
Matt (Identify Known Malware by Hash (MD5) Across Network, Apr. 15, 2014, 2 pages).*
UPX—Wikipedia, the free encyclopedia, 3 sheets [retrieved on Mar. 27, 2015], retrieved from the internet: http://en.wikipedia.org/wiki/UPX.
Cuckoo, Automated Malware Analysis—CucKoo Sandbox, 2 sheets [retrieved on Mar. 30, 2015], retrieved from the internet: http://www.cuckoosandbox.org/about.html.
Ssdeep—Latest version 2.12, Fuzzy Hashing and ssdeep, 2 sheets [retrieved on Mar. 31, 2015], retrieved from the internet: http://ssdeep.sourceforge.net/.
Ulrich Bayer, et al. "Scalable, Behavior-Based Malware Clustering", 18 sheets [retrieved on Mar. 31, 2015], retrieved from the interne: https://www.cs.ucsb.edu/~chris/research/doc/ndss09_cluster.pdf.
Marek Olszewski, et al. "JIT Instrumentation—A Novel Approach to Dynamically Instrument Operating Systems", 2009, 14 sheets, Dept. of Electrical and Computer Engineering, Dept. of Computer Science, University of Toronto, Toronto, Ontario, Canada.
Sirinda Palahan, et al. "Extraction of Statistically Significant Malware Behaviors", 2013, 10 sheets, Penn State University.

* cited by examiner

```
.004010F6:  31B1FF0F4000D80000000      5xor    d,[ecx][0004000FFF],0000000
.004011000: E2F4                       loop    .004010F6  --t5
```

FIG. 7B

```
000000030:  8AD1                mov    dl,cl
000000032:  2403                and    al,3
000000034:  80E21F              and    dl,01F
000000037:  F6EA                imul   dl
000000039:  80E103              and    cl,3
00000003C:  F6E9                imul   cl
00000003E:  B1FE                mov    cl,-2  ;'■'
000000040:  2AC8                sub    cl,al
000000042:  300F                add    [edi],cl
```

FIG. 8B

| | | |
|---|---|---|
| 00000000: | 3B02 | lmov eax,[edx] |
| 00000002: | 8B5D30 | mov ebx,[ebp][030] |
| 00000005: | 8A1C0B | mov bl,[ebx][ecx] |
| 00000008: | 881C08 | mov [eax][ecx],bl |
| 0000000B: | 8B45F4 | mov eax,[ebp][-00C] |
| 0000000E: | 8B4DF8 | mov ecx,[ebp][-8] |
| 00000011: | 0FACC802 | shrd eax,ecx,2 |
| 00000015: | C1E902 | shr ecx,2 |
| 00000018: | 8B4DF4 | mov ecx,[ebp][-00C] |
| 0000001B: | 8B5DF8 | mov ebx,[ebp][-8] |
| 0000001E: | 33C7 | xor eax,edi |
| 00000020: | 33DB | xor ebx,ebx |
| 00000022: | C1E11E | shl ecx,01E |
| 00000025: | 8B4D10 | mov ecx,[ebp][010] |
| 00000028: | 0BC3 | or eax,ebx |
| 0000002A: | 03C8 | add ecx,eax |
| 0000002C: | 8B450C | mov eax,[ebp][00C] |
| 0000002F: | 8B18 | mov ebx,[eax] |
| 00000031: | 3B4B50 | cmp ecx,[ebx][050] |
| 00000034: | 894D10 | mov [ebp][010],ecx |
| 00000037: | 72C7 | jc 00000000 ----^1 |

FIG. 9B

```
00000000: 8B55AC      mov   edx,[ebp][-054]
00000003: 81F9        
00000005: C1E11E      shl   ecx,01E
00000008: 33FB        xor   edi,ebx
0000000A: 8BC7        mov   eax,edi
0000000C: C1E802      shr   eax,2
0000000F: 0BC1        or    eax,ecx
00000011: 8B4DC8      mov   ecx,[ebp][-038]
00000014: 8A0C01      mov   cl,[ecx][eax]
00000017: 880C10      mov   [eax][edx],cl
0000001A: 8B4DE4      mov   ecx,[ebp][-01C]
0000001D: 8B4DE4      mov   edx,[ebp][-01C]
00000020: 8B55E4      mov   edx,[ebp][-01C]
00000023: 33CB        xor   ecx,ebx
00000025: C1E902      shr   ecx,2
00000028: C1E21E      shl   edx,01E
0000002B: 0BCA        or    ecx,edx
0000002D: 03C8        add   ecx,eax
0000002F: 8B45E4      mov   eax,[ebp][-01C]
00000032: 33C3        xor   eax,ebx
00000034: 83D0FC      and   eax,-4
00000037: 83E7FC      and   edi,-4
0000003A: 03C7        add   eax,edi
0000003C: C1E91E      shr   ecx,01E
0000003F: 0BC8        or    ecx,eax
00000041: 8B45FC      mov   eax,[ebp][-4]
00000044: 8B55FC      mov   edx,[ebp][-4]
00000047: C1E202      shl   edx,2
0000004A: C1E81E      shr   eax,01E
0000004D: 0BD0        or    edx,eax
0000004F: 33CE        xor   ecx,esi
00000051: 33D6        xor   edx,esi
00000053: 3BCA        cmp   ecx,edx
00000055: 75          jnz   000000057      --x
```

FIG. 10B

```
.text:00421084 ; =============== S U B R O U T I N E =======================================
.text:00421084
.text:00421084 ; Attributes: bp-based frame
.text:00421084
.text:00421084 sub_421084      proc near               ; CODE XREF: sub_421140+96↓p
.text:00421084                                         ; sub_430DFC+25↓p ...
.text:00421084
.text:00421084 arg_0           = dword ptr  8
.text:00421084 arg_4           = dword ptr  0Ch
.text:00421084
.text:00421084                 push    ebp
.text:00421085                 mov     ebp, esp
.text:00421087                 push    ebx
.text:00421088                 push    esi
.text:00421089                 push    edi
.text:0042108A                 mov     edi, offset dword_4999F0
.text:0042108F                 cmp     dword ptr [edi], 0
.text:00421092                 jnz     short loc_421100
.text:00421094                 push    40h             ; flProtect
.text:00421096                 push    1000h           ; flAllocationType
.text:0042109B                 push    1000h           ; dwSize
.text:004210A0                 push    0               ; lpAddress
.text:004210A2                 call    VirtualAlloc_0
.text:004210A7                 mov     esi, eax
.text:004210A9                 mov     eax, ds:dword_4999EC
.text:004210AE                 mov     [esi], eax
.text:004210B0                 lea     edx, [esi+4]
.text:004210B3                 mov     eax, offset unk_491B4C
.text:004210B8                 mov     ecx, 2
.text:004210BD                 call    sub_4030FC
.text:004210C2                 mov     edx, offset sub_42185C
.text:004210C7                 lea     eax, [esi+5]
.text:004210CA                 call    sub_42107C
.text:004210CF                 mov     [esi+6], eax
.text:004210D2                 lea     ebx, [esi+0Ah]
.text:004210D5
.text:004210D5 loc_4210D5:                             ; CODE XREF: sub_421084+74↓j
.text:004210D5                 mov     byte ptr [ebx], 0E8h
.text:004210D8                 lea     edx, [esi+4]
.text:004210DB                 mov     eax, ebx
.text:004210DD                 call    sub_42107C
.text:004210E2                 mov     [ebx+1], eax
.text:004210E5                 mov     eax, [edi]
.text:004210E7                 mov     [ebx+5], eax
.text:004210EA                 mov     [edi], ebx
.text:004210EC                 add     ebx, 0Dh
.text:004210EF                 mov     eax, ebx
.text:004210F1                 sub     eax, esi
.text:004210F3                 cmp     eax, 0FFCh
.text:004210F8                 jl      short loc_4210D5
.text:004210FA                 mov     ds:dword_4999EC, esi
```

```
.text:00434916 loc_434916:                    ; CODE XREF: sub_4348D9+22↑j
.text:00434916                 lea     eax, [ebp+flOldProtect]
.text:00434919                 push    eax             ; lpflOldProtect
.text:0043491A                 push    [ebp+flOldProtect] ; flNewProtect
.text:0043491D                 push    [ebp+dwSize]    ; dwSize
.text:00434920                 push    edi             ; lpAddress
.text:00434921                 call    esi ; VirtualProtect
.text:00434923
.text:00434923 loc_434923:                    ; CODE XREF: sub_4348D9+19↑j
.text:00434923                 pop     esi
.text:00434924                 leave
.text:00434925                 retn    8
.text:00434925 sub_4348D9      endp
```

FIG. 12

AUTOMATIC MALWARE SIGNATURE EXTRACTION FROM RUNTIME INFORMATION

CROSS-REFERENCE TO RELATED APPLICATION

This application is a continuation of U.S. application Ser. No. 14/726,173, filed on May 29, 2015, which is incorporated herein by reference in its entirety.

BACKGROUND OF THE INVENTION

1. Field of the Invention

The present invention relates generally to computer security, and more particularly but not exclusively to methods and systems for generating patterns for malware detection.

2. Description of the Background Art

Various types of malware, such as computer viruses, worms, Trojans, rootkits, and other malicious codes, have plagued computer systems throughout the world. Malware may be detected by antivirus programs or other computer security software. An antivirus program may include malware patterns that contain signatures of known malware. The antivirus program may employ a pattern matching algorithm to scan files or other data format for content that match one or more malware signatures. Pattern matching is a relatively effective algorithm for detecting malware. However, pattern matching is reliant on having access to up-to-date and accurate malware patterns.

Malware signatures may be extracted from sample data that contain malware. The malware signatures may be formed into patterns that are distributed to computers that employ compatible antivirus programs. A malware pattern may comprise a hash (e.g., a cyclic redundancy check), a manually-created script, or an automatically-created script (e.g., based on binary similarity). A major challenge facing today's antivirus researchers is how to generate effective malware patterns efficiently and quickly given the large number of sample data that potentially contain malware.

SUMMARY

In one embodiment, a computer system receives a file and instruments an original code of the file in memory. The resulting instrumented code allows for collection of runtime information of the original code. An unpacking routine that includes one or more instructions that execute several times, modify memory locations, and execute instructions in the modified memory locations is identified. The unpacking routine is deemed a malware signature and incorporated into a malware pattern. An unpacking behavior diagram can also be generated from the runtime information.

These and other features of the present invention will be readily apparent to persons of ordinary skill in the art upon reading the entirety of this disclosure, which includes the accompanying drawings and claims.

DESCRIPTION OF THE DRAWINGS

FIGS. 7B, 8B, 9B, and 10B show corresponding unpacking routines for the unpacking behavior diagrams of FIGS. 7A, 8A, 9A, and 10A, respectively.

FIG. 11 shows an example analysis performed on a malware in accordance with an embodiment of the present invention.

FIG. 12 shows the memory locations modified by an unpacking routine of the malware of FIG. 11.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention: Persons of ordinary skill in the art will recognize, however, that the invention can be practiced without one or more of the specific details. In other instances, well-known details are not shown or described to avoid obscuring aspects of the invention.

Figure 1:
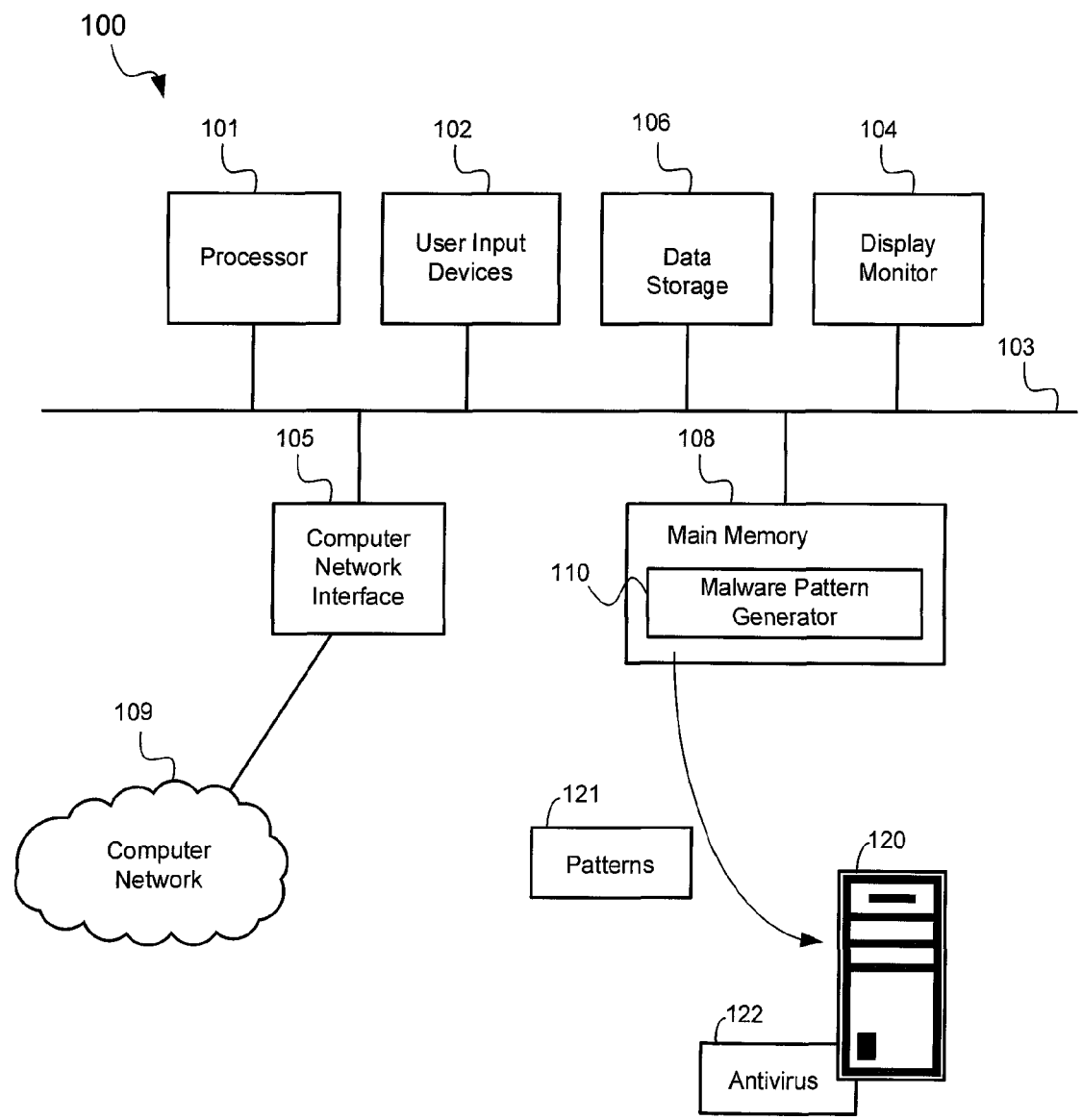
FIG. 1 shows a schematic diagram of a computer system in accordance with an embodiment of the present invention.

Referring now to FIG. 1, there is shown a schematic diagram of a computer system 100 in accordance with an embodiment of the present invention. The computer system 100 may be employed to generate malware patterns for an antivirus, for example. The computer system 100 may have fewer or more components to meet the needs of a particular application. The computer system 100 may include one or more processors 101. The computer system 100 may have one or more buses 103 coupling its various components. The computer system 100 may include one or more user input devices 102 (e.g., keyboard, mouse), one or more data storage devices 106 (e.g., hard drive, optical disk, Universal Serial Bus memory), a display monitor 104 (e.g., liquid crystal display, flat panel monitor), a computer network interface 105 (e.g., network adapter, modem), and a main memory 108 (e.g., random access memory). The computer network interface 105 may be coupled to a computer network 109, which in this example includes the Internet.

The computer system 100 is a particular machine as programmed with software modules, which in the example of FIG. 1 includes a malware pattern generator 110. The malware pattern generator 110 may comprise computer-readable program code stored non-transitory in the main memory 108 for execution by the processor 101. The malware pattern generator 110 may automatically extract malware signatures from sample data (e.g., files) and generate corresponding malware patterns 121. The malware patterns 121 may be released and distributed to one or more subscribing computers 120 that include an antivirus program 122 or other computer security module that employs the malware patterns 121 to detect malware.

The malware pattern generator 110 is depicted in FIG. 1 as being implemented in software for illustration purposes only. In other embodiments, the malware pattern generator 110 may be implemented in hardware (e.g., application-specific integrated circuit, logic circuit) or combination of hardware and software.

Figure 2:
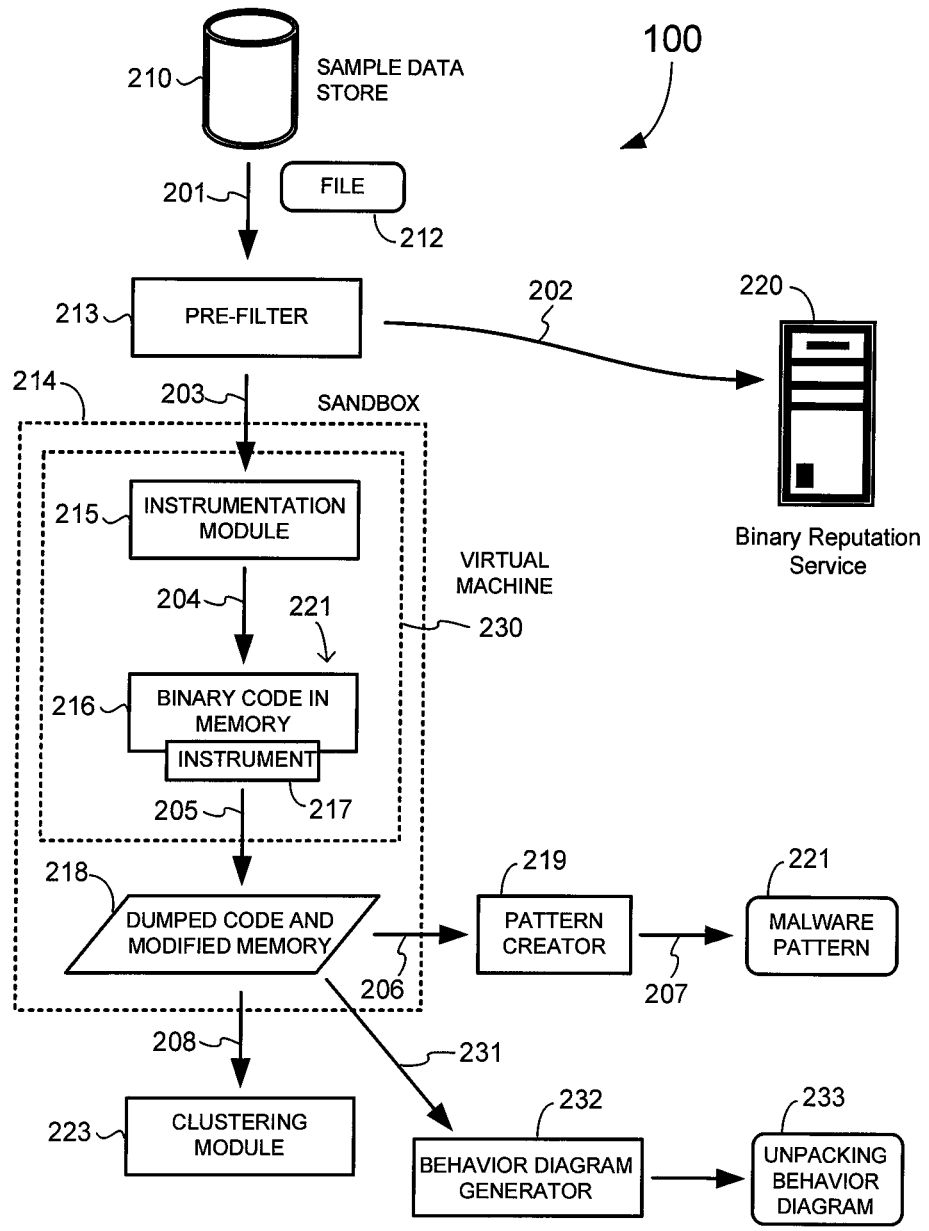
FIG. 2 shows a flow diagram that illustrates the operation of the system of FIG. 1 in accordance with an embodiment of the present invention.

FIG. 2 shows a flow diagram that illustrates the operation of the computer system 100 in accordance with an embodiment of the present invention. In the example of FIG. 2, the malware pattern generator 110 (see FIG. 1) comprises a pre-filter 213, a sandbox environment 214, an instrumentation module 215, a pattern creator 219, and a clustering module 223. In one embodiment, the pre-filter 213 and the clustering module 223 are optional components of the malware pattern generator 110. The malware pattern generator 110 may further include an unpacking behavior diagram generator 232.

In the example of FIG. 2, the computer system 100 includes or has access to a sample data store 210. In one embodiment, the sample data store 210 comprises a plurality of files obtained from user submissions, computer security vendors, honey pots, and other sources of potentially malicious data. As will be more apparent below, the computer system 100 may retrieve a file 212 from the sample data store 210, collect runtime information of an original code of the file 212 in memory, automatically extract a malware signature of the file 212 from the runtime information, and generate a pattern that incorporates the extracted malware signature.

In the example of FIG. 2, the pre-filter 213 receives the file 212 (see arrow 201) and determines whether or not the file 212 comprises malware. In one embodiment, the pre-filter 213 queries a binary reputation service hosted by a remotely located computer system 220 to determine a reputation of the file 212 (see arrow 202). The binary reputation service may maintain a database or other listing of reputations of known files. A file may have a good reputation (i.e., known good file), a bad reputation (i.e., known bad file, such as a file that comprises malware), a suspicious reputation (i.e., a file that is most likely bad but unconfirmed), or an unknown reputation. The pre-filter 213 may generate a hash of the binary (also referred to as an "executable") of the file 212 and provide the hash to the computer system 220. The computer system 220 may determine the reputation of the file 212 by comparing the hash of the binary of the file 212 to hashes of binaries of known files. The computer system 220 may provide the reputation of the file 212 to the pre-filter 213 of the computer system 100.

Generally speaking, a packed file is a file that has been compressed to reduce the size of the file. The packed file includes an unpacking routine that decompresses the packed file into memory during runtime. That is, the unpacking routine unpacks the file into the memory when the file is executed. The UPX (Ultimate Packer for eXecutables) program is an example of a well-known file packer. The binary of a malware file may be packed to make the malware harder to detect. Accordingly, the pre-filter 213 deems a packed file to be a suspicious file. The pre-filter 213 may employ an entropy-deviation algorithm to identify a packed file. The pre-filter 213 may also employ other suitable algorithms for identifying packed files.

In the example of FIG. 2, the pre-filter 213 optionally pre-filters the files from the samples data store 210 such that the malware pattern generation process is performed only on suspicious files, i.e., files that have the characteristics of malware, and are thus likely to be malware, but have not been confirmed to be malware. Files confirmed to be malware may be presumed to already have corresponding malware patterns. In other embodiments, the malware pattern generation process is performed on a different subset of files or on all files in the sample data store 210. In the example of FIG. 2, the file 212 is deemed to be suspicious and is accordingly passed on to the sandbox environment 214 for further analysis.

The sandbox environment 214 provides a safe computing environment where a target file, which in this example is the file 212, may be safely executed without compromising the computer system 100. The sandbox environment 114 may be implemented using the CUCKOO SANDBOX malware analysis system, for example. Other suitable sandboxes or tools for creating an isolated computing environment may also be employed. The sandbox environment 214 may include a virtual machine 230 for executing the instrumentation module 215 and a target file. The sandbox environment 214 may receive target files from the pre-filter 213 (or other sources), distribute the target files to the virtual machine 230 for runtime analysis, and collect runtime information of the target files from the instrumentation module 215.

In one embodiment, the instrumentation module 215 comprises a dynamic binary instrumentation tool. The instrumentation module 215 may be implemented using the PIN instrumentation tool from the INTEL CORPORATION. Other suitable instrumentation tools may also be employed. When a target file is executed in the virtual machine 230, the binary code of the target file, which is also referred to herein as "original code", is loaded in memory for execution as a process. The instrumentation module 215 inserts instrumentation code into the original code in memory to generate an instrumented code. The instrumentation code allows for monitoring of the process of the target file at runtime. More specifically, the instrumentation code may collect runtime information of the original code, such as the type of instructions (generic, stack operation, memory read, memory write, memory read/write) executed, instruction addresses, instruction execution counts, modified memory contents, API (application programming interface) call records, etc.

Figure 3:
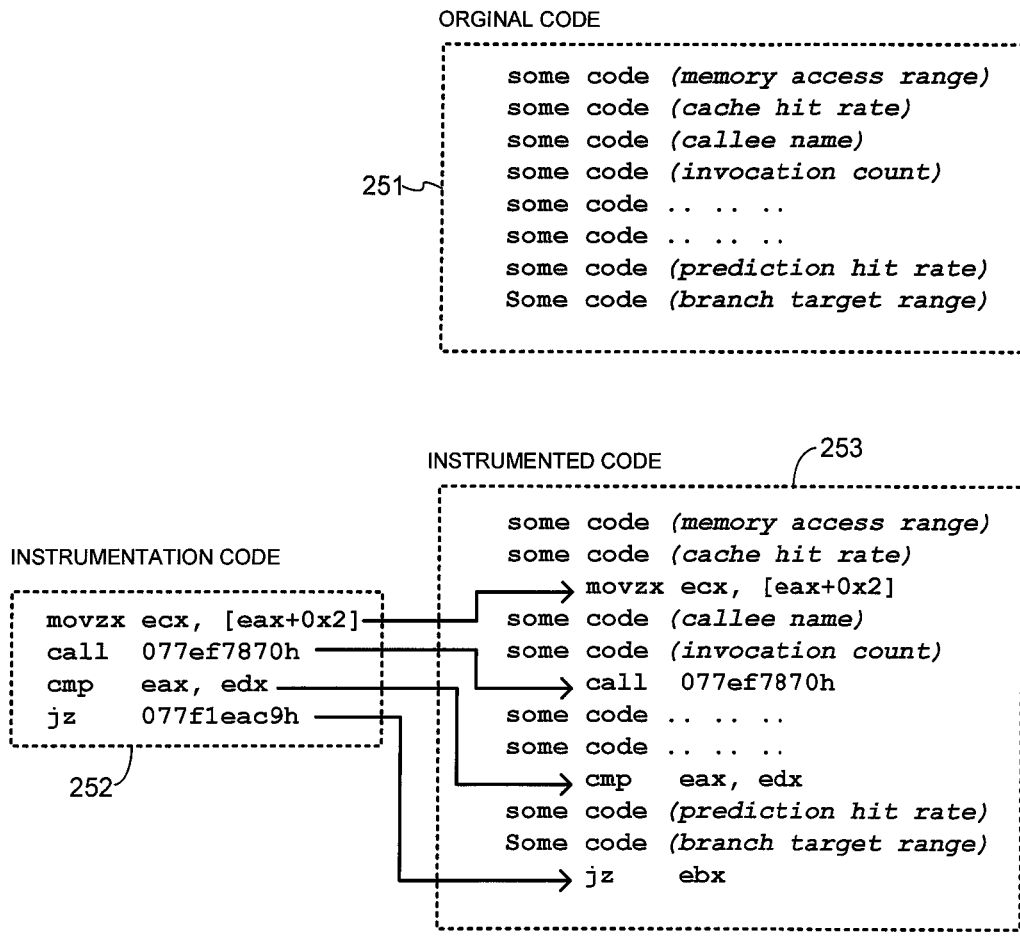
FIG. 3 illustrates an example operation of an instrumentation module in accordance with an embodiment of the present invention.

FIG. 3 illustrates an example operation of the instrumentation module 215. It is to be noted that that, in one embodiment, the instrumentation module 215 operates on binary code. However, in FIG. 3 and subsequent figures, the binary code is shown in assembly language form or pseudo-code form for ease of illustration.

In the example of FIG. 3, an original code 251 to be instrumented is loaded into memory. The original code 251 is the code of a target file. The instrumentation module 215 inserts an instrumentation code 252 into the original code 251 to generate the instrumented code 253. In the example of FIG. 3, the instrumentation code 252 comprises a plurality of instructions that are inserted in various locations on the original code to collect information from the original code during runtime, such as memory modifications made by the original code, routines of the original code that are executed in loops, API calls of the original code, etc. In general, the instrumentation module 251 may insert an instruction before and/or after particular instructions, such as instructions that write to memory locations, perform loops, manipulate the instruction pointer, etc.

Referring back to FIG. 2, the pre-filtered file 212 is received in the sandbox environment 214 (see arrow 203). There, the instrumentation module 215 inserts instrumentation code 217 into the original code 216 of the file 212 in memory to generate an instrumented code 221 (see arrow 204). The instrumented code 221 is executed, with the instrumentation code 217 collecting runtime information therefrom. The collected runtime information is received by the sandbox environment 214 (see arrow 205). The collected runtime information may include instructions noted by the instrumentation code 217, contents of modified memory locations, number of times particular instructions are executed, etc. (see output 218). The collected runtime information may be received by the pattern creator 219 (see arrow 206), which generates a malware pattern 221 (see arrow 207) that includes a malware signature identified from the collected runtime information.

A clustering module 223 may optionally cluster identified malware signatures to determine if a malware signature appears in a plurality of target files (see arrow 208). For example, the clustering module 223 may generate a context triggered piecewise hashing (CTPH) hash of a malware signature identified from the file 212 and compare the resulting CTPH hash to CTPH hashes of other malware signatures of other target files. This allows for determination as to whether or not the malware signature extracted from the file 212 appears in more than one target file. If so, the malware signature is most likely highly useful in identifying other malware. To generate a CTPH hash, the clustering module 208 may employ the SSDEEP CTPH hash generator, for example. The clustering module 208 may also employ other suitable hash generators.

Figure 4:
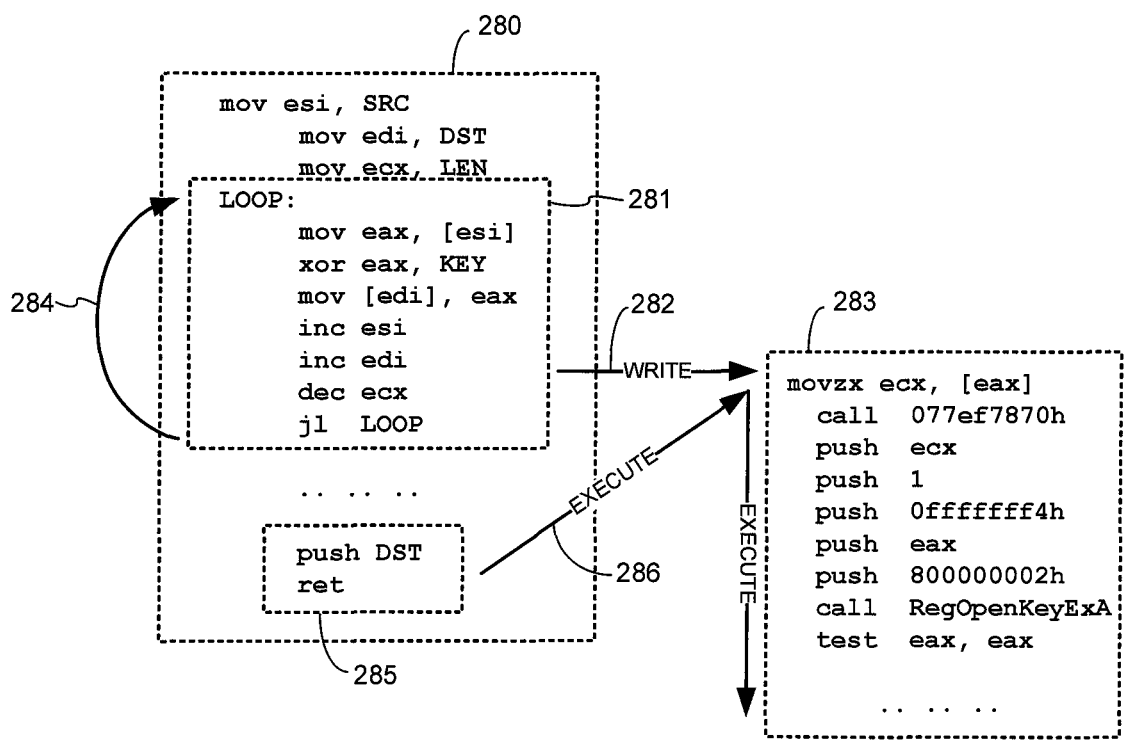
FIG. 4 shows a portion of an example original code of a target file that has been packed.

FIG. 4 shows a portion of an example original code 280 of a target file that has been packed. In the example of FIG. 4, the original code 280 includes an unpack routine 281. The unpacking routine 281 includes a loop (see arrow 284), which executes one or more instructions several times to unpack the instructions 283 into the memory (see arrow 282). Once the instructions 283 have been unpacked into the memory, the instructions 283 are then executed by the instructions 285 (see arrow 286). The original code 280 may be instrumented to collect runtime analysis therefrom. In one embodiment, the malware pattern generator 110 identifies the unpacking routine 281 from the collected runtime information and uses the unpacking routine 281 as the malware signature. That is, the unpacking routine 281 may be identified from the collected runtime information as a code block that has one or more instructions that are executed several times, that modify memory locations, and that execute instructions in the modified memory locations.

An instrumentation code may perform different actions depending on the instruction type. For a memory modification instruction, such as "mov [edi], eax", the instrumentation code may identify the instruction type (e.g., IARG_MEMORYREAD_EA/IARG_MEMORYWRITE_EA), offset to current instruction (e.g., EIP), and memory address being modified. The memory address being modified may be consolidated on each pass into a modified range. For example, with the following memory address modifications:

1st: mov edi, 0x01; mov [edi], eax
2nd: mov edi, 0x02; mov [edi], eax
3rd: mov edi, 0x03; mov [edi], eax the modification range is from 0x01 to 0x03. The instrumentation code may also identify the execution count (number of times the instruction is executed, for loop identification) when the instruction involves memory modification. For a general instruction, the instrumentation code may identify the instruction type, offset to current instruction, and execution count.

Figure 5:
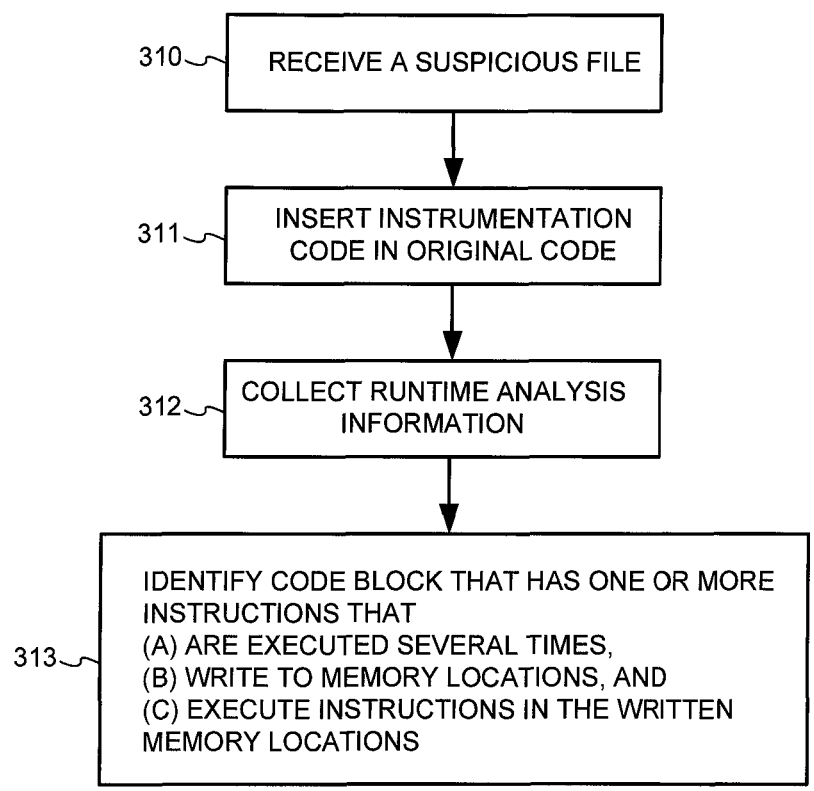
FIG. 5 shows a flow diagram of a computer-implemented method of identifying a malware signature in accordance with an embodiment of the present invention.

FIG. 5 shows a flow diagram of a computer-implemented method of identifying a malware signature in accordance with an embodiment of the present invention. The method of FIG. 5 may be employed to automatically extract a malware signature from a suspicious file. The method of FIG. 5 may be performed by the computer system 100, for example. In the example of FIG. 5, a suspicious file is received in the computer system 100 (step 310). The computer system 100 inserts instrumentation code in the original code of the suspicious file loaded in memory to generate an instrumented code (step 311). During runtime, when the instrumented code is executed in the memory, the instrumentation code collects runtime information from the original code (step 312). The computer system 100 identifies a malware signature of the suspicious file as being a code block containing one or more instructions that are executed several times, write to memory locations, and execute instructions written in the memory locations (step 313). The code block itself may be employed as a malware signature and be formatted into a malware pattern that can be used by a computer security module, such as an antivirus, to detect malware.

Figure 6:
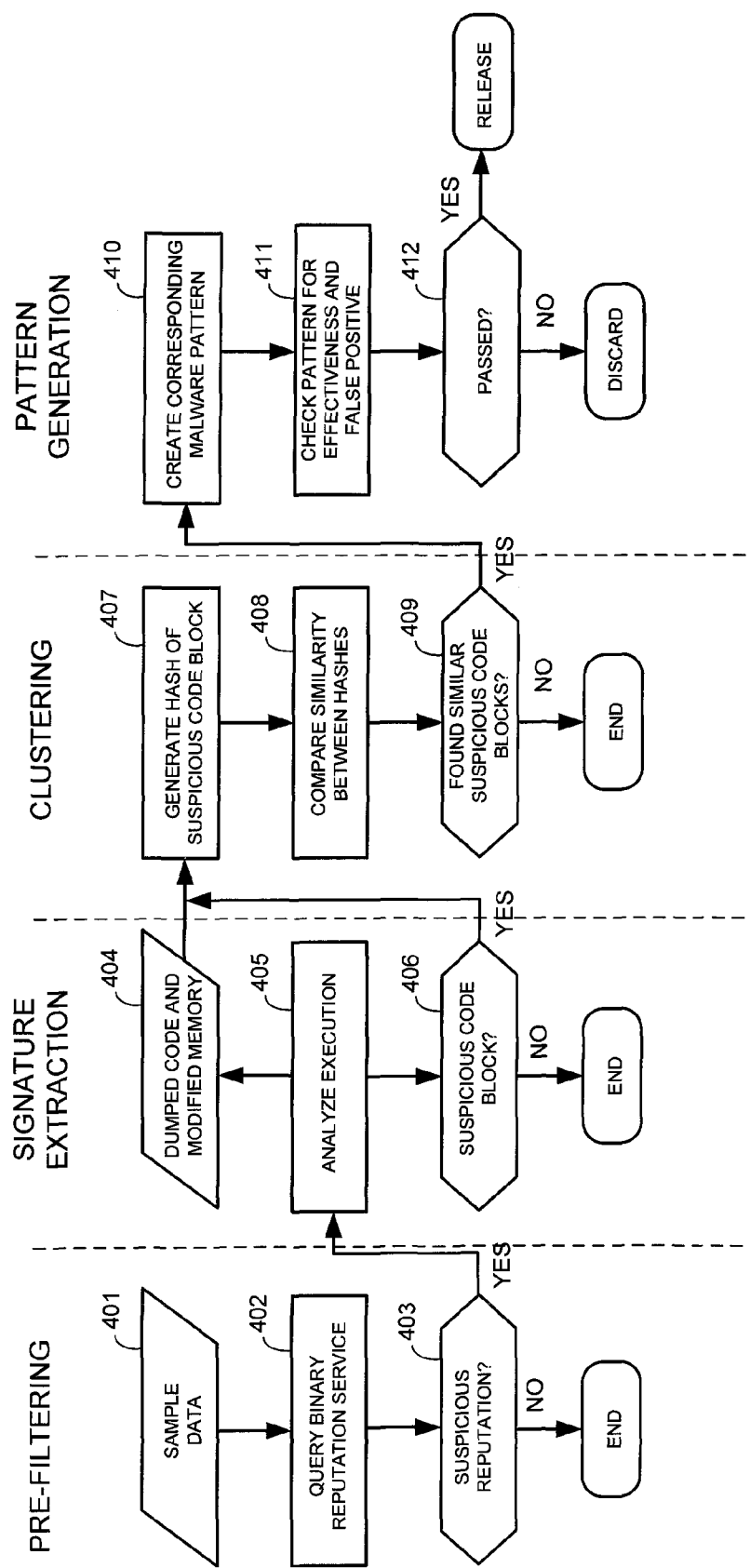
FIG. 6 shows a flow diagram of a computer-implemented method of generating a malware pattern in accordance with an embodiment of the present invention.

FIG. 6 shows a flow diagram of a computer-implemented method of generating a malware pattern in accordance with an embodiment of the present invention. The method of FIG. 6 may be performed by the computer system 100, for example. The method of FIG. 6 may include four phases, namely pre-filtering, malware signature extraction, clustering, and pattern generation.

In the example of FIG. 6, a target file is received from a sample data store (input 401). A binary reputation service is queried to determine a reputation of the target file (step 402). The method ends, i.e., a malware pattern is not generated for the target file, when the target file does not have a suspicious reputation.

When the target file has a suspicious reputation, the execution behavior of the target file is analyzed (step 405). In one embodiment, the execution behavior of the target file is analyzed by adding an instrumentation code in an original code of the target file as loaded in memory. The instrumentation code collects runtime information of the original code during execution (output 404). The runtime information is analyzed to identify a suspicious code block (step 406), such as a code block containing one or more instructions that are executed several times, that modify memory locations, and execute instructions written in the modified memory locations. The suspicious code block may comprise an unpacking routine. The method ends when the original code of the target file does not have a suspicious code block.

When the original code of the target file has a suspicious code block, the suspicious code block may be designated as the target file's malware signature. A CTPH hash of the code block is generated (step 407) and the similarity of the CTPH hash to other CTPH hashes of other malware signatures extracted from other files is determined (step 408). The method ends when the CTPH hash comparison indicates that there are no other files with the same or similar malware signature as the target file.

When the CTPH hash comparison indicates that there are other files with the same or similar malware signature as the target file, a corresponding malware pattern that incorporates the malware signature is generated (step 410). The malware pattern may incorporate the malware signature as-is or convert the malware signature into some other format that is compatible with an antivirus program or other computer security module that may employ the malware pattern to detect malware by pattern matching. The malware pattern may be checked against samples of known bad files to check for effectiveness and against samples of known good files to check for false positives (step 411). The method ends when the malware pattern is ineffective (e.g., cannot detect known malware) or results in an unacceptable number of false positives. Otherwise, the malware pattern is released for use by a compatible antivirus program (e.g., see antivirus 122 of FIG. 1) or other computer security module to detect malware.

It is to be noted that packed files are not necessarily bad. However, malware writers have been known to pack files to make malware more difficult to detect. In the case of known file packer programs, such as the UPX program, a computer security module may easily unpack and examine a packed file in a sandbox environment. However, this is not the case when a file is packed using an unknown file packer. As can be appreciated from the foregoing, embodiments of the present invention allow for detection of unknown unpacking routines, which are most likely employed in malware.

Embodiments of the present invention may be employed not just for automatically identifying malware signatures and generating malware patterns, but also in other computer security-related applications. In one embodiment, the unpacking behavior diagram generator 232 (see FIG. 2) generates an unpacking behavior diagram 233 from runtime information collected from an instrumented code (see arrow 231, FIG. 2). As its name implies, an unpacking behavior diagram graphically illustrates the unpacking action of an original code, allowing for faster and easier identification of suspicious unpacking routines.

FIGS. 7A, 8A, 9A, and 10A show example unpacking behavior diagrams generated by the behavior diagram generator 232 from collected runtime information in accordance with embodiments of the present invention. In the example of FIGS. 7A, 8A, 9A, and 10A, the vertical axis (y-axis) represents memory locations being modified (i.e., being written to) by the unpacking routine, and the horizontal axis (x-axis) represents the locations in memory of instructions in the instrumented code. The corresponding unpacking routines for FIGS. 7A, 8A, 9A, and 10A are shown in FIGS. 7B, 8B, 9B, and 10B, respectively.

Figure 7A:
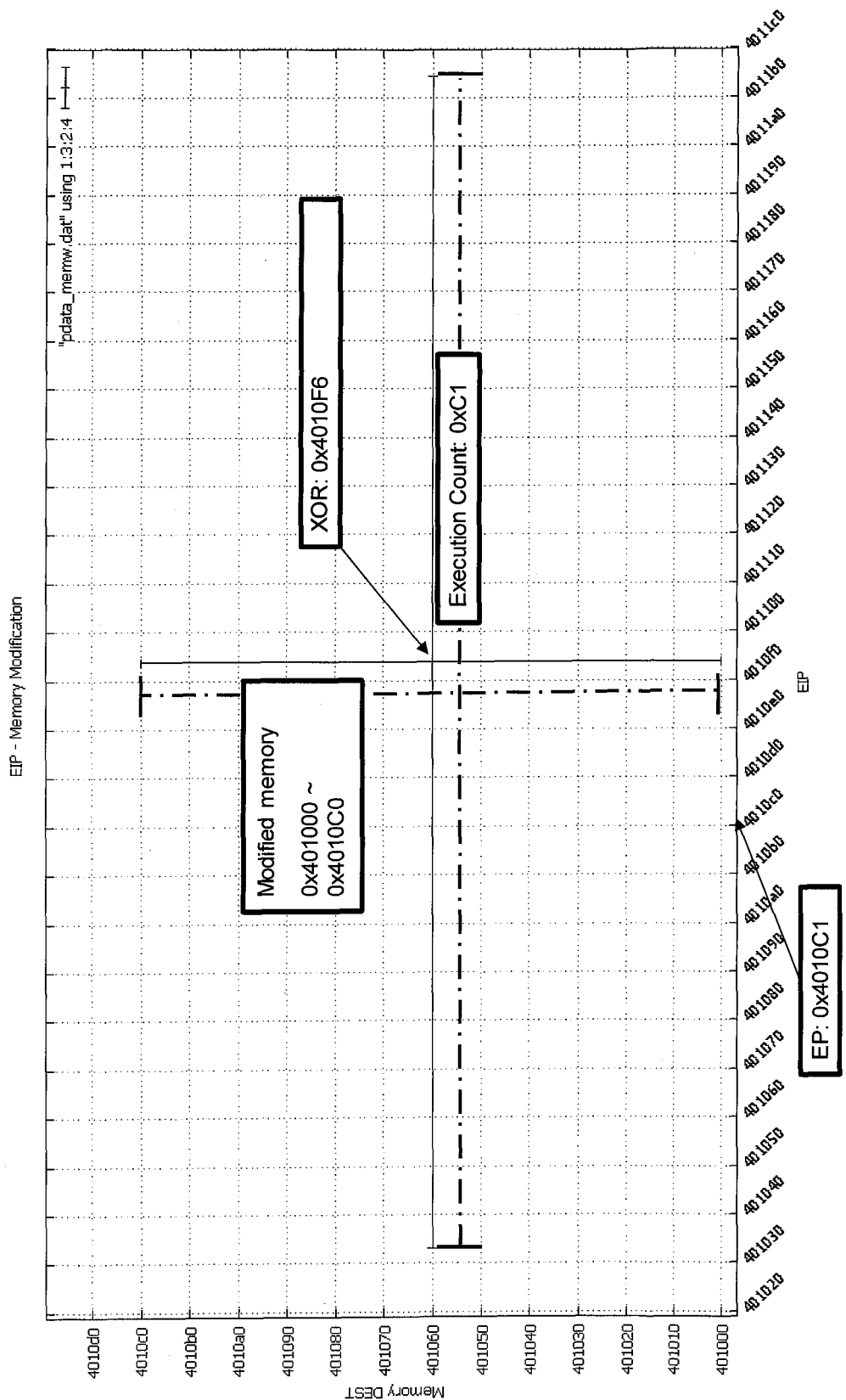
FIGS. 7A, 8A, 9A, and 10A show example unpacking behavior diagrams generated from collected runtime information in accordance with embodiments of the present invention.

Beginning with FIG. 7A, there is shown an unpacking behavior diagram generated from runtime information in accordance with an embodiment of the present invention. In the example of FIG. 7A, the unpacking routine, which is shown in FIG. 7B, employs a simple XOR decoding algorithm. The behavior of the unpacking routine may be detected by instrumentation code comprising instructions before and after an XOR instruction. In the example of FIG. 7A, the collected runtime information indicates that an XOR instruction in location 0x4010F6 is executed 0xC1 times (represented by the dashed line from left to right) and modified the memory locations 0x401000 to 0x4010C0. This is indicative of an unpacking routine, and would be highly suspicious if the unpacking routine is unknown. As can be appreciated, although the behavior of an unpacking routine can be automatically detected by the malware pattern generator 110, having a diagram that graphically shows the unpacking behavior is very helpful to a human antivirus researcher in analyzing the malware. As a particular example, a pattern reviewer can readily identify the memory modification behavior of the unpacking routine from the unpacking behavior diagram.

Figure 8A:
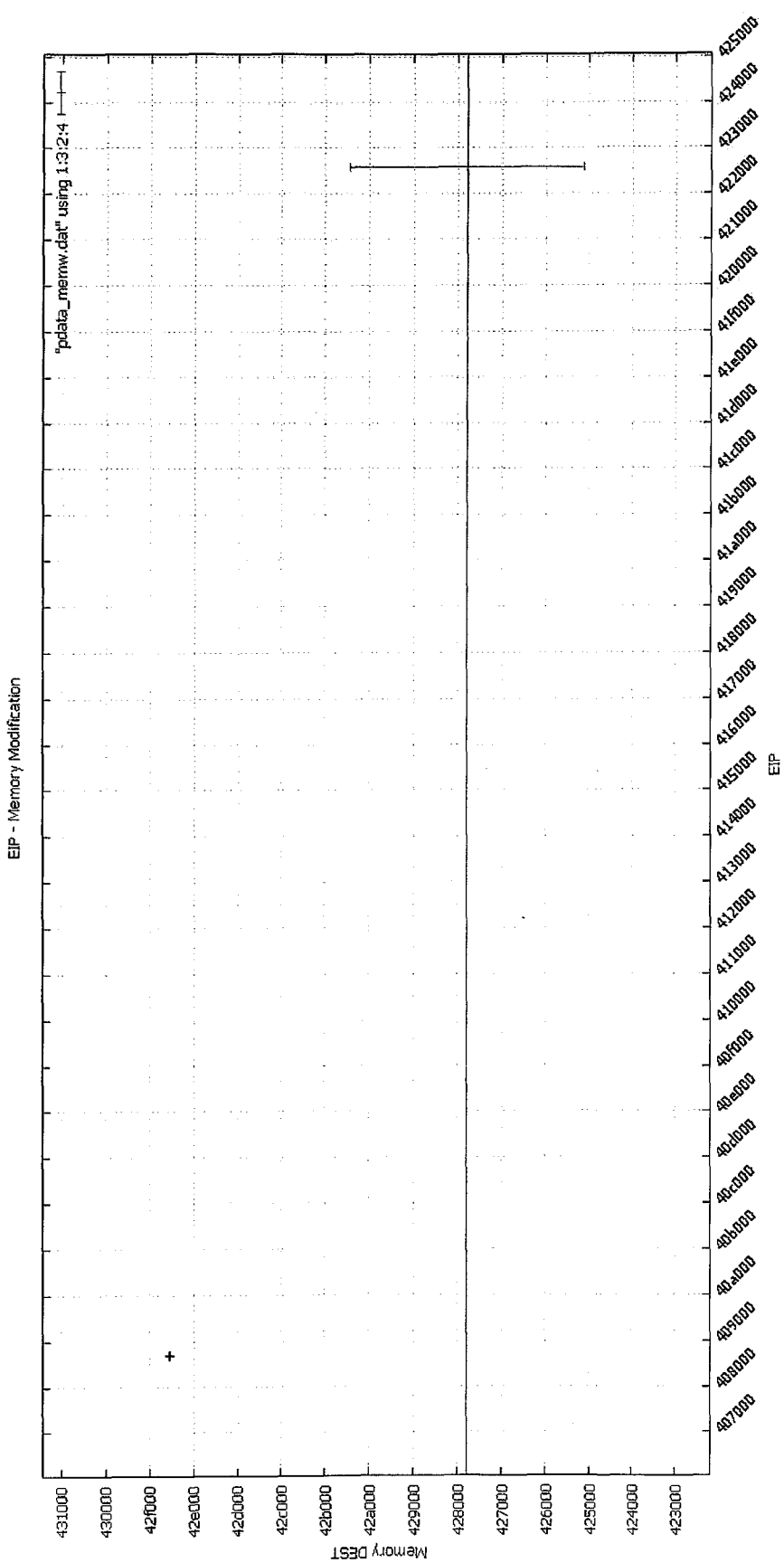

FIG. 8A shows an unpacking behavior diagram of a first unpacking routine of the ZBOT Trojan horse malware. The ZBOT Trojan horse malware includes several, nested decompression loops, with the first unpacking routine performing the first decompression. In the example of FIG. 8A, the cross on the right hand side of the diagram indicates that the first unpacking routine, which is shown in FIG. 8B, is a loop that is executed several times (horizontal axis) to modify memory locations 0x425000 to 0x42b000 (vertical axis).

Figure 9A:
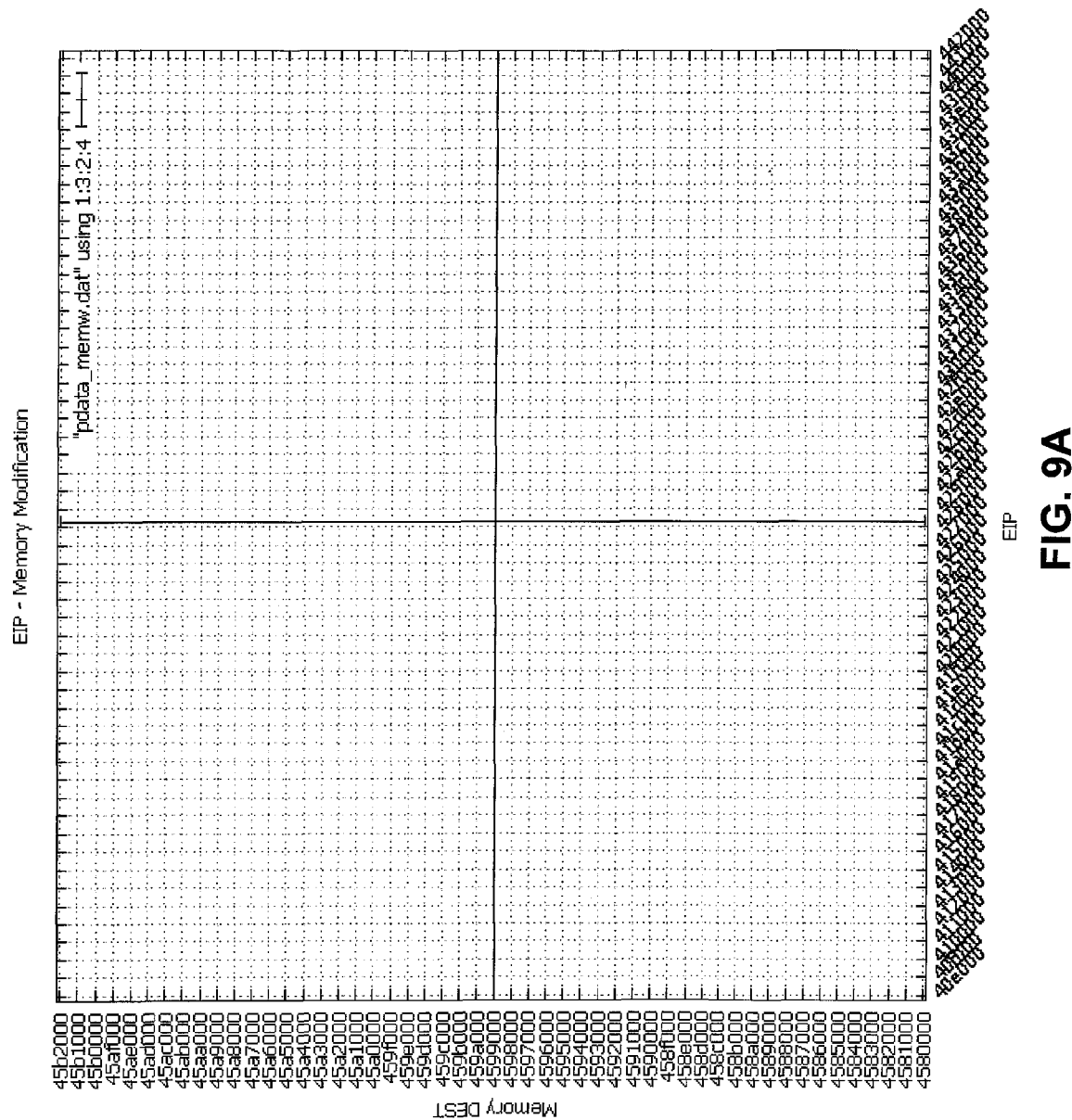

FIG. 9A shows an unpacking behavior diagram of a second unpacking routine of the ZBOT Trojan horse malware. The second unpacking routine, which is shown in FIG. 9B, performs a second decryption after the first decompression. In the example of FIG. 9A, the cross in the middle of the diagram indicates that the memory location that was modified by the first unpacking routine (near the entry point 0x428000) is executed several times (horizontal axis) to modify memory locations 0x4580000 to 0x45b2000. (vertical axis).

Figure 10A:
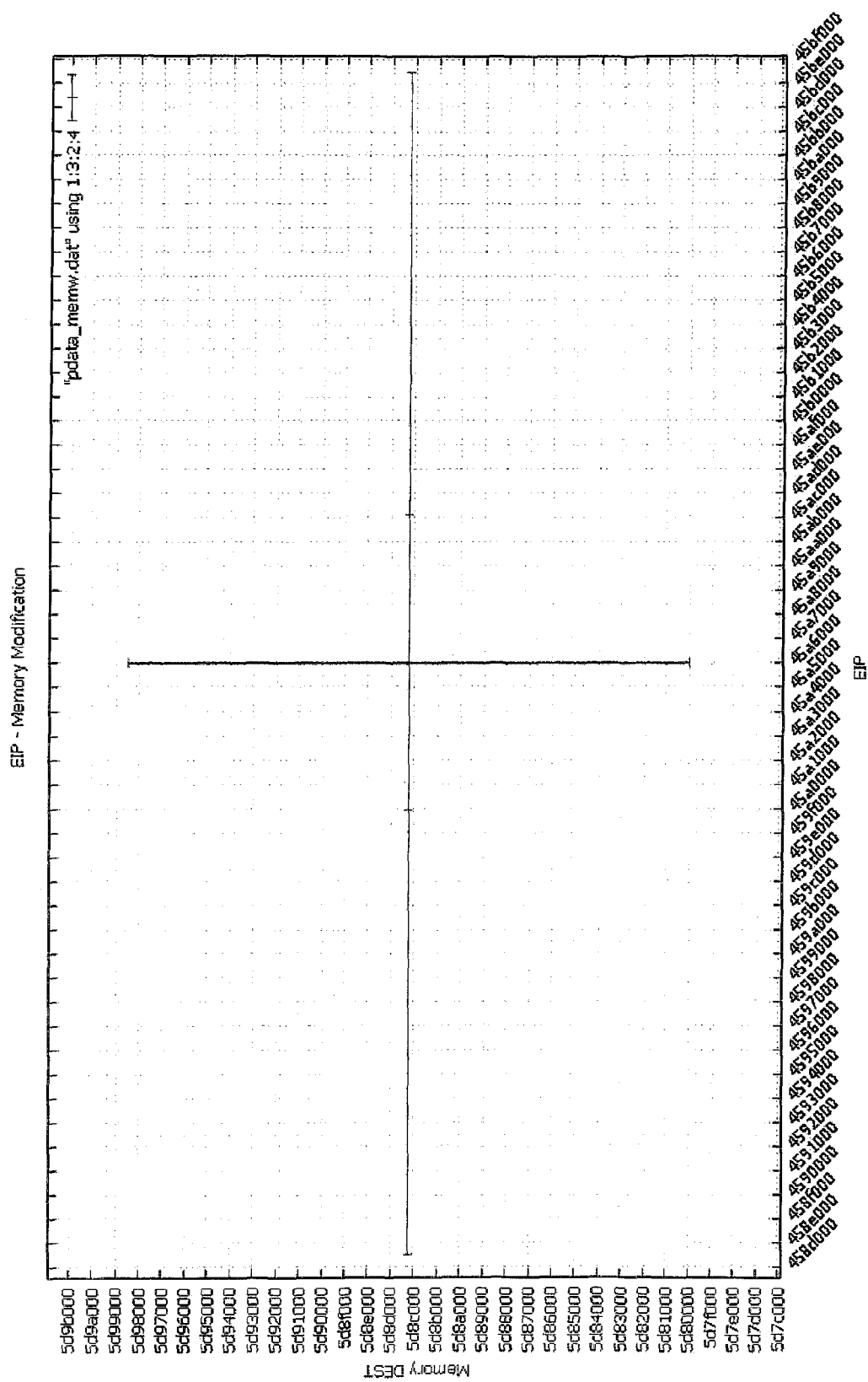

FIG. 10A shows an unpacking behavior diagram of a third unpacking routine of the ZBOT Trojan horse malware. The third unpacking routine, which is shown in FIG. 10B, performs a third decompression after the second decompression. In the example of FIG. 10A, the cross in the middle of the diagram indicates that the memory location that was modified by the second unpacking routine (near the entry point 0x45a6000) is executed several times (horizontal axis) to modify memory locations 0x5d80000 to 0x5d98000 (vertical axis).

FIG. 11 shows an example analysis performed on a malware in accordance with an embodiment of the present invention. The analysis, which is performed on the ZBOT Trojan horse malware, may be performed using the malware pattern generator 110. In the example of FIG. 11, the ZBOT Trojan horse malware has been identified to include an unpacking routine 452 that executes several times to modify memory locations. The instructions in the modified memory locations, which are shown in FIG. 12, are then executed. The unpacking routine 452 may be employed as a malware signature for identifying the ZBOT Trojan horse.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A computer-implemented method comprising:
receiving a file in a computer;
generating an instrumented code by inserting an instrumentation code in an original code of the file loaded in a memory of the computer;
collecting runtime information of the original code when the instrumented code is executed;
from the runtime information, identifying an unpacking routine that includes one or more instructions that are executed a plurality of times in a loop and that modify memory locations;
deeming the unpacking routine as a malware signature; and
generating a malware pattern that incorporates the malware signature.

2. The computer-implemented method of claim 1, further comprising:
receiving the malware pattern in another computer; and
in the other computer, scanning another file using the malware pattern.

3. The computer-implemented method of claim 1, further comprising:
from the runtime information, identifying the unpacking routine that executes instructions that are stored in the memory locations that have been modified by the unpacking routine.

4. The computer-implemented method of claim 1, further comprising:
   prior to generating the instrumented code, determining if the file is a suspicious file that is likely to comprise malware.

5. The computer-implemented method of claim 4, wherein determining if the file is a suspicious file comprises:
   querying a binary reputation service for a reputation of the file.

6. The computer-implemented method of claim 1, further comprising:
   prior to generating the malware pattern, generating a hash of the malware signature; and
   comparing the hash of the malware signature to hashes of other malware signatures.

7. A system comprising:
   a first computer system that receives a file, generates an instrumented code by inserting an instrumentation code into an original code of the file loaded in a memory of the first computer system, collects runtime information of the original code when the instrumented code is executed, identifies from the runtime information an unpacking routine that includes one or more instructions that are executed a plurality of times in a loop and that modify memory locations, deems the unpacking routine as a malware signature, and generates a malware pattern that incorporates the malware signature; and
   a second computer system that receives the malware pattern and scans another file for presence of malware using the malware pattern.

8. The system of claim 7, wherein the first computer system identifies from the runtime information the unpacking routine that executes instructions that are stored in memory locations that have been modified by the unpacking routing.

9. The system of claim 7, wherein the first computer system, prior to generating the instrumented code, determines if the file is a suspicious file that is likely to comprise malware.

10. The system of claim 9, wherein the first computer system determines if the file is a suspicious file by querying a binary reputation service for a reputation of the file.

11. The system of claim 7, wherein the first computer system, prior to generating the malware pattern, generates a hash of the malware signature and compares the hash of the malware signature to hashes of other malware signatures.

12. A non-transitory computer-readable medium comprising instructions stored thereon, that when executed by a processor, perform the steps of:
   receiving a file in a computer;
   generating an instrumented code by inserting an instrumentation code in an original code of the file loaded in a memory of the computer;
   collecting runtime information of the original code when the instrumented code is executed;
   from the runtime information, identifying an unpacking routine that includes one or more instructions that are executed a plurality of times in a loop and that modify memory locations;
   deeming the unpacking routine as a malware signature; and
   generating a malware pattern that incorporates the malware signature.

13. The non-transitory computer-readable medium of claim 12, wherein the instructions of the computer-readable medium further perform the steps of:
   providing the malware pattern to another computer that scans another file using the malware pattern.

14. The non-transitory computer-readable medium of claim 12, wherein the instructions of the computer-readable medium further perform the steps of:
   from the runtime information, identifying the unpacking routine that includes the one or more instructions and that executes instructions that are stored in the memory locations modified by the unpacking routine.

15. The non-transitory computer-readable medium of claim 12, wherein the instructions of the computer-readable medium further perform the steps of:
   prior to generating the instrumented code, determining if the file is a suspicious file that is likely to comprise malware.

16. The non-transitory computer-readable medium of claim 12, wherein the instructions of the computer-readable medium further perform the steps of:
   querying a binary reputation service for a reputation of the file to determine if the file is a suspicious file.

17. The non-transitory computer-readable medium of claim 12, wherein the instructions of the computer-readable medium further perform the steps of:
   prior to generating the malware pattern, generating a hash of the malware signature;
   comparing the hash of the malware signature to hashes of other malware signatures.

* * * * *